United States Patent [19]

Weaver et al.

[11] Patent Number: 4,568,738
[45] Date of Patent: Feb. 4, 1986

[54] THIOPHEN-2-YLAZOPYRAZOLE COMPOUNDS AS COLORANTS FOR TEXTILE FIBERS

[75] Inventors: Max A. Weaver; Clarence A. Coates, Jr., both of Kingsport, Tenn.

[73] Assignee: Eastman Kodak Company, Rochester, N.Y.

[21] Appl. No.: 590,809

[22] Filed: Mar. 19, 1984

[51] Int. Cl.$^4$ ............ C09B 29/033; C09B 29/36; D06P 3/26; D06P 3/36

[52] U.S. Cl. ................ 534/769; 534/560; 534/590; 534/740

[58] Field of Search ........... 260/152, 163, 146 R, 260/147; 534/769

[56] References Cited

U.S. PATENT DOCUMENTS

2,832,761  4/1958  Straley et al. ............ 260/158 X
4,301,070 11/1981  Giles et al. ............ 260/155

FOREIGN PATENT DOCUMENTS

1394365  5/1975  United Kingdom ........ 260/152

*Primary Examiner*—Floyd D. Higel
*Attorney, Agent, or Firm*—J. Frederick Thomsen

[57] ABSTRACT

Thiophen-2-ylazopyrazole dyes useful for dyeing polyesters, cellulose acetate esters, and polyamides in fast yellow shades have the general formula:

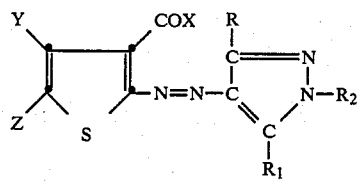

wherein: X is alkyl, allyloxy, alkoxy, aryl, aryloxy, amino, alkylamino, arylamino, cyclohexyloxy, thienyl, cycloalkylamino, N,N-dialkylamino, or N-alkyl-N-arylamino; Y is hydrogen, alkyl, or aryl; Z is alkyl, aryl, alkylsulfonyl, 2-benzothiazolyl, cyano or COX; R and $R_1$ are alkyl or aryl; $R_2$ is hydrogen, alkyl, aryl, acyl, benzothiazolyl, pyridyl, sulfolanyl, quinolyl, thiocarbamyl, carbamyl, alkoxycarbonyl, aroyl, aryl-carbamyl and alkanoyl; and wherein the hydrocarbon moieties of the above radicals may be substituted with up to three of —OH, alkoxy, hydroxyalkoxy, carbamyl, and similar groups conventionally used in the azo dye art.

8 Claims, No Drawings

THIOPHEN-2-YLAZOPYRAZOLE COMPOUNDS AS COLORANTS FOR TEXTILE FIBERS

DESCRIPTION

This invention relates to thiophen-2-ylazopyrazole dyes useful for dyeing polyesters, cellulose acetate esters, and polyamides in fast yellow shades.

The present dyes have the general formula:

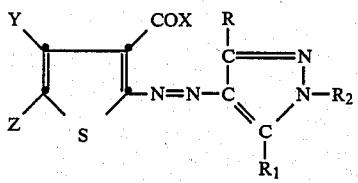

wherein: X is alkyl, allyloxy, alkoxy, aryl, aryloxy, amino, alkylamino, arylamino, cyclohexyloxy, thienyl, cycloalkylamino, N,N-dialkylamino, or N-alkyl-N-arylamino; Y is hydrogen, alkyl, or aryl; Z is alkyl, aryl, alkylsulfonyl, 2-benzothiazolyl, cyano or COX; R and $R_1$ are alkyl or aryl; $R_2$ is hydrogen, alkyl, aryl, acyl, benzothiazolyl, pyridyl, sulfolanyl, quinolyl, thiocarbamyl, carbamyl, alkoxycarbonyl, aroyl, arylcarbamyl and alkanoyl; wherein the hydrocarbon moieties of the above radicals may be substituted with up to three of —OH, alkoxy, hydroxyalkoxy, carbamyl, alkylcarbamyl, alkylcarbamyloxy, dialkylcarbamyl, arylcarbamyl, arylcarbamyloxy, —$NO_2$, alkanoylamino, alkanoyl, alkoxycarbonyl, alkanoyloxy, —$CF_3$, aryloxy, halogen, alkoxyalkoxy, alkoxycarbonyloxy, aryl, —CN, alkenyl, succinimido, phthalimide, furyl, cyclohexyl, and cycloalkyl substituted with hydroxyalkyl; and wherein the alkyl groups or moieties within the above definitions of Y, Z, R, $R_1$ and $R_2$ contain from 1-8 carbons, of X contain from 1-10 carbons, and are straight or branched chain.

The dyes of this invention color polyester, cellulose acetate, and polyamides in clear yellow shades and have excellent lightfastness on all three substrates. This property is quite unusual in view of disperse dyes of similar type such as those of Br. Pat. No. 1,394,365. The present dyes, in general, also exhibit other improved properties such as fastnes to sublimation, chlorine, heat, ozone, oxides of nitrogen, gas, perspiration, crock, and wash, and exhibit good build, pH stability, bloom resistance, dye bath exhaustion, depth of shade, leveling, strike rate, migration, and the like.

The present dyes are prepared as shown by the reaction scheme below by diazotizing substituted 2-aminothiophenes II and coupling with 1,3-diketo couplers III to produce intermediate compounds IV, followed by reaction with hydrazine or substituted hydrazines to produce the dyes V.

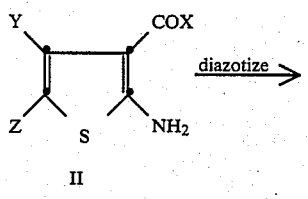

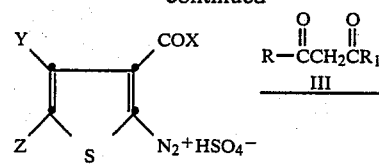

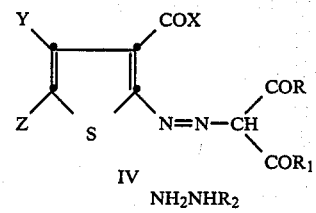

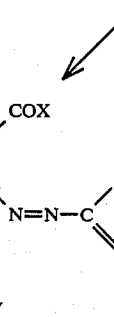

Dyes V, when COX is an amide group, are best prepared by reacting the corresponding dye where X is $OCH_3$ with ammonia or an aliphatic amine. Compounds II are prepared as disclosed in [Z. Chem., Volume 2, page 305, (1962)]; Chem. Ber., Volume 98, page 3571 (1965) and Volume 99, page 2712 (1966); Chem. Heterocyclic Compounds, Volume 2, page 285 (1966) and Volume 3, Page 178 (1967). Compounds III and the hydrazines are readily commercially available.

Typical useful hydrazines include the following:

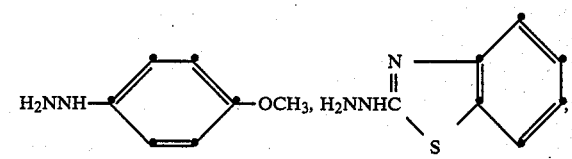

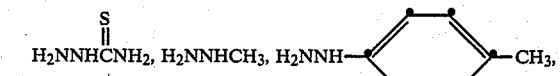

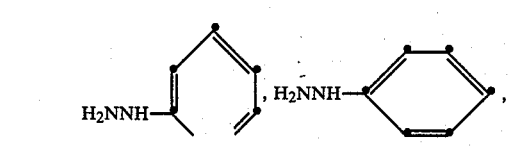

-continued

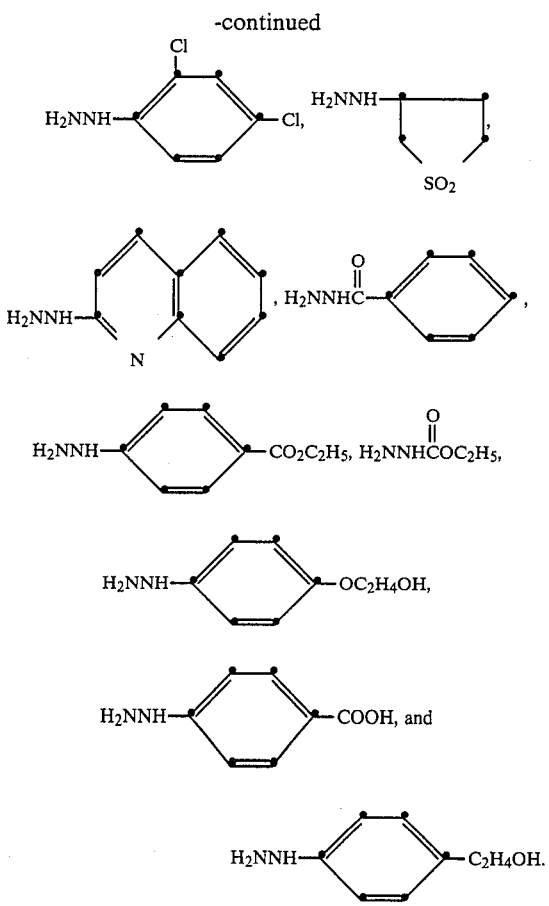

The preferred dyes are those where: X is alkoxy or alkylamine; Y is H or alkyl; Z is carbalkoxy, acyl, CONHaryl, cyano, or aryl; R and $R_1$ are alkyl or aryl; and $R_2$ is H, aryl, or alkyl, and sulfolanyl. The most preferred dyes are those of Examples 2, 3, 4, 26, 90, 92, and 93 herein.

The following examples will further illustrate the invention.

EXAMPLE 1

Diazotization and Coupling

Sodium nitrite (3.6 g.) was added portionwise to 25 ml of concentrated $H_2SO_4$, allowing the temperature to rise. The solution was cooled and 50 ml of 2:5 acid (2 parts propionic acid:5 parts acetic acid—by volume) was added at <20° C. After further cooling, 2-amino-3,5-dicarbethoxy-4-methylthiophene (12.9 g., 0.05 m) was added at 0°–5° C. and then another 50 ml of 2:5 acid was added at <5° C. Stirring was continued at 0°–5° C. for 1.5 hr.

For the coupling, 2,4-pentanedione (5 g., 0.05 m) was dissolved in about 200 ml of water containing 75 g. of sodium acetate. Crushed ice was added for cooling and the above diazo solution added. Additional water/ice mixture was added as needed as thickening occurred. The reaction mixture was stirred for 15 min. at about 10°–15° C., heated to about 70° C. and filtered hot. The intermediate dye was collected by filtration, washed with water, and dried in air, and has the following structure:

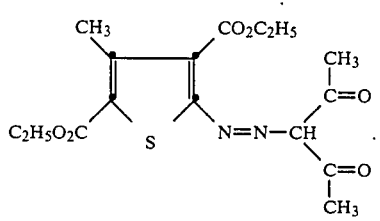

EXAMPLE 2

Reaction With Hydrazine

The dye from Example 1 (1.84 g., 0.005 m) was added to a solution of 64% hydrazine hydrate (0.5 g.) in methanol (10 ml) and heated to reflux. As the reaction mixture approached reflux temperature the yellow product crystallized. After 5 min. at reflux, the reaction mixture was cooled and the dye (1.5 g) was collected by filtration, washed with methanol and dried in air. The dye has the structure

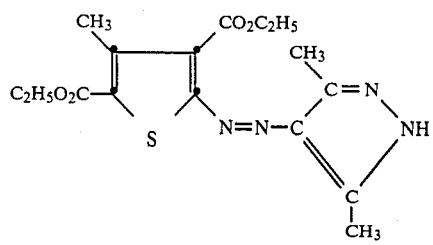

and produces bright yellow shades on cellulose acetate, polyamide, and polyester fibers.

EXAMPLE 3

Reaction With 2-Hydroxyethylhydrazine

The dye derived from diazotizing 2-amino-3,5-dicarbomethoxy-4-methylthiophene and 2,4-pentanedione as illustrated in Example 1 (3.0 g), N,N-dimethylformamide (10 ml), and 2-hydroxyethylhydrazine—90% (1.0 g) were mixed and heated at 65° C. for 5 min. After cooling, methanol (40 ml) was added to precipitate the yellow dye (2.0 g) which was collected by filtration, washed with methanol and dried in air. The dye has the structure

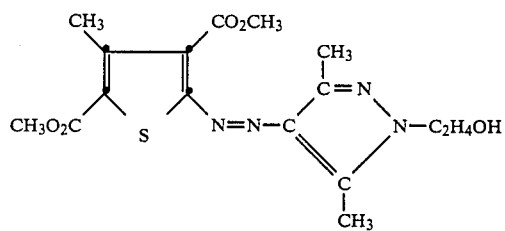

and produces bright yellow shades on cellulose acetate, polyamide, and polyester fibers. This dye can be reacted further on the hydroxyethyl group to give additional functional derivatives.

EXAMPLE 4

Reaction With 2-Hydrazinobenzothiazole

A mixture of the 1,3-diketo dye from Example 1 (0.5 g), 2-hydrazinobenzothiazole (0.3 g.) and N,N-dimethylformamide (10 ml) was heated at 95°–100° C. for 1 hr. During the last portion of the heating period the dye crystallized. Ethanol (10 ml) was added to further precipitate the dye and the mixture cooled. The dye was collected by filtration, washed with ethanol, and dried in air. It has the structure

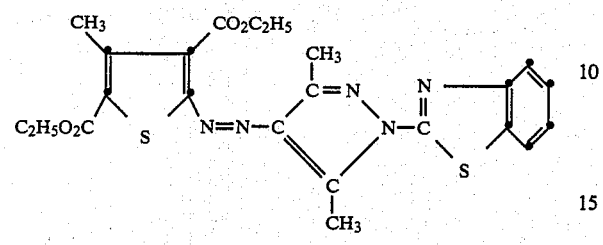

and produced bright lightfast shades on polyester and has excellent pH stability and fastness to sublimation.

EXAMPLE 5

Reaction With Propionic Anhydride

The dye of Example 1 (0.5 g), propionic anhydride (20 ml), and a trace of concentrated $H_2SO_4$ were heated at reflux for 6 hrs. Upon cooling the yellow dye crystallized and was filtered, washed with methanol and dried in air. The acylation product has the structure

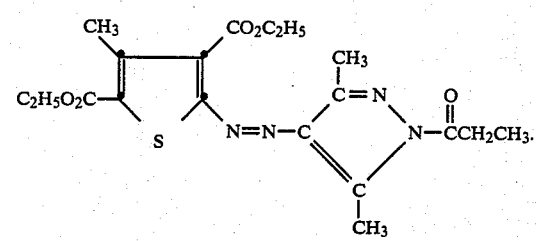

The following table gives additional specific dyes of the present invention.

TABLE I

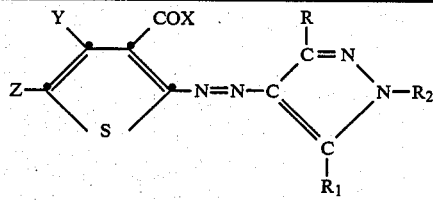

| Ex. | X | Y | Z | R | $R_1$ | $R_2$ |
|-----|---|---|---|---|-------|-------|
| 6 | $OC_2H_5$ | $CH_3$ | $CO_2C_2H_5$ | $CH_3$ | $C_6H_5$ | H |
| 7 | $OC_2H_5$ | $CH_3$ | $CO_2C_2H_5$ | $C_6H_5$ | $C_6H_5$ | H |
| 8 | $OC_2H_5$ | $CH_3$ | $CO_2C_2H_5$ | $C_6H_5$ | $C_6H_5$ | $C_2H_4OH$ |
| 9 | $CH_3$ | $CH_3$ | $CO_2C_2H_5$ | $CH_3$ | $CH_3$ | $C_2H_4OCOCH_3$ |
| 10 | $OC_2H_5$ | H | $C_2H_5$ | $CH_3$ | $CH_3$ | $C_2H_4Cl$ |
| 11 | $OC_2H_5$ | H | $CO_2C_2H_5$ | $CH_3$ | $CH_3$ | $CH_2CH_2CN$ |
| 12 | $O-CH_2-CH=CH_2$ | $CH_3$ | Ph | $CH_3$ | $CH_3$ | $CH_2CH_2CONH_2$ |
| 13 | $OC_2H_5$ | $CH_3$ | $CO_2C_2H_5$ | $CH_3$ | $CH_3$ | $CH_2CH_2OCONHC_6H_5$ |
| 14 | $OCH_2CH_2CN$ | $CH_3$ | $CO_2C_2H_5$ | $CH_3$ | $CH_3$ | $CH_2CH_2OCONHC_2H_5$ |
| 15 | $OCH_3$ | Ph | $CO_2C_2H_5$ | $C_2H_5$ | $C_2H_5$ | $CH_2CH_2OC_2H_5$ |
| 16 | $OCH_3$ | $CH_3$ | $SO_2CH_3$ | $CH_3$ | $CH_3$ | $CH_2C_6H_5$ |
| 17 | $OCH_2CH_2CON(C_2H_5)_2$ | $CH_3$ | $CO_2C_2H_5$ | $CH_3$ | $CH_3$ | $CONH_2$ |
| 18 | $OCH_3$ | $CH_3$ | $CO_2C_2H_5$ | $CH_3$ | $CH_3$ | $CO_2C_2H_5$ |
| 19 | Ph—p-$CF_3$ | $CH_3$ | $CO_2C_2H_5$ | $CH_3$ | $CH_3$ | $CO_2C_6H_5$ |
| 20 | $OCH_3$ | $CH_3$ | CN | $CH_3$ | $CH_3$ | $CH_3$ |
| 21 | $OCH_2CH_2CN$ | $CH_3$ | $CO_2C_4H_9$—n | $CH_3$ | $CH_3$ | 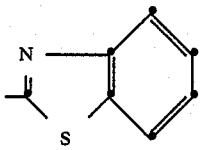 |
| 22 | Ph | $CH_3$ | $CO_2CH_2CH(CH_3)_2$ | $CH_3$ | $CH_3$ | 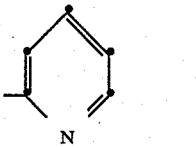 |
| 23 | $OCH_2Ph$ | $CH_3$ | $CO_2CH_2CH(C_2H_5)C_4H_9$—n | $CH_3$ | $CH_3$ | $C_6H_5$ |
| 24 | $OCH_3$ | $CH_3$ | $CO_2CH_3$ | $CH_3$ | $CH_3$ | $C_6H_4$—p-$OCH_3$ |
| 25 | $OCH_3$ | $CH_3$ | $CH_3$ | $C_4H_9$—n | $C_4H_9$—n | $C_6H_4$—p-$NO_2$ |
| 26 | $OC_2H_5$ | $CH_3$ | $CO_2C_2H_5$ | $CH_3$ | $CH_3$ | 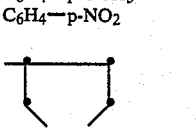 |

TABLE I-continued

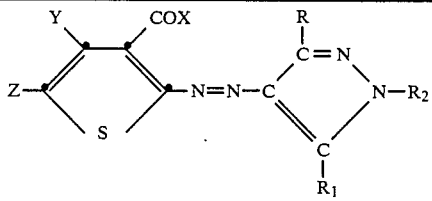

| Ex. | X | Y | Z | R | R₁ | R₂ |
|---|---|---|---|---|---|---|
| 27 | OCH₃ | CH₃ | CO₂CH₃ | CH₃ | CH₃ | 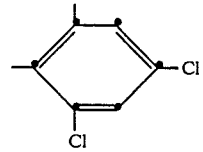 2,4,5-trichlorophenyl |
| 28 | OCH₃ | CH₃ | CO₂Ph | CH₃ | CH₃ |  4-chlorophenyl |
| 29 | NH₂ | CH₃ | CO₂CH₃ | CH₃ | CH₃ | 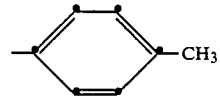 4-methylphenyl |
| 30 | OCH₃ | CH₃ | COPh | CH₃ | CH₃ | 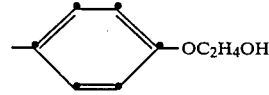 4-OC₂H₄OH-phenyl |
| 31 | NHC₂H₅ | CH₃ | CO₂CH₃ | CH₃ | CH₃ | 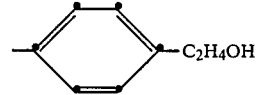 4-C₂H₄OH-phenyl |
| 32 | Ph—p-NO₂ | CH₃ | CONH₂ | CH₃ | CH₃ | 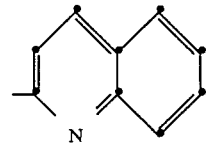 quinolinyl |
| 33 | OCH₃ | CH₃ | CO₂C₂H₅ | CH₃ | CH₃ | 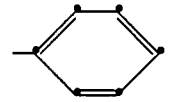 phenyl |
| 34 | NHPh | H | COCH₃ | C₃H₇—n | C₃H₇—n | H |
| 35 | OCH₃ | H | OPh | CH₃ | CH₃ | H |
| 36 | OC₆H₁₁ | H | COCH(CH₃)₂ | CH₃ | CH₃ | CH₂CH₂CON(C₂H₅)₂ |
| 37 | OCH₃ | H | 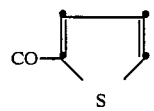 | CH₃ | CH₃ | C₆H₅ |
| 38 | OCH₃ | H | CN | CH₃ | CH₃ | H |
| 39 | NHC₆H₁₁ | H | CN | C₆H₅ | C₆H₅ | CH₂CH₂NHCOCH₃ |
| 40 | OCH₃ | H | SO₂CH₃ | CH₃ | CH₃ | 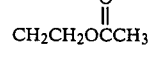 CH₂CH₂OCCH₃ (O) |
| 41 | OCH₂CH₂NHCOCH₃ | H | Ph | CH₃ | CH₃ | CH₂CH₂OH |
| 42 | N(C₂H₅)₂ | H | C₂H₅ | CH₃ | CH₃ | H |
| 43 | OCH₃ | CH₃ | CONHPh | CH₃ | CH₃ | CH₂CH₂CF₃ |
| 44 | OC₄H₉—n | CH₃ | CO₂C₄H₉—n | CH₃ | CH₃ | CH₂CH₂OH |
| 45 | OCH₂CH₂CH(CH₃)₂ | CH₃ | CO₂CH(CH₃)₂ | CH₃ | CH₃ | CH₂CH₂OPh |

TABLE I-continued

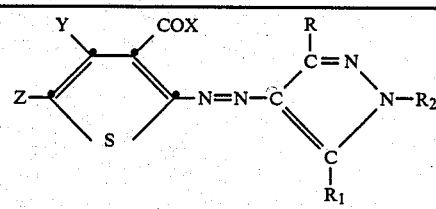

| Ex. | X | Y | Z | R | R₁ | R₂ |
|---|---|---|---|---|---|---|
| 46 | $OC_{10}H_{21}$—n | $CH_3$ | $CO_2CH_3$ | $CH_3$ | $CH_3$ | $CH_2CH_2OCH_2CH_2OC_2H_5$ |
| 47 | $OC_8H_{17}$—n | $CH_3$ | $CO_2CH_2CH(C_2H_5)C_4H_9$—n | $CH_3$ | $CH_3$ | $CH_2CH_2OH$ |
| 48 | $OCH_3$ | $CH_3$ | $CO_2C_2H_4OC_2H_5$ | $CH_3$ | $CH_3$ | $CH_2C_6H_{10}$—4-OH |
| 49 | $NCH_3(Ph)$ | $CH_3$ | $CO_2C_2H_4OC_2H_4OC_2H_5$ | $CH_3$ | $CH_3$ | H |
| 50 | $OCH_3$ | $CH_3$ | $CO_2CH_2Ph$ | $CH_3$ | $CH_3$ | H |
| 51 | $OCH_3$ | $CH_3$ | $CO_2CH_2OPh$ | $CH_3$ | $CH_3$ | H |
| 52 | $OCH_3$ | $CH_3$ | $CO_2C_2H_2Cl$ | $CH_3$ | $CH_3$ | H |
| 53 | $OCH_3$ | $CH_3$ | $CO_2C_2H_4CN$ | $CH_3$ | $CH_3$ | H |
| 54 | $OCH_3$ | $CH_3$ | $CO_2Ph$ | $CH_3$ | $CH_3$ | $CH_2C_6H_{11}$ |
| 55 | $OCH_3$ | $CH_3$ | $CO_2C_2H_4N(COCH_2)(COCH_2)$ | $CH_3$ | $CH_3$ | H |
| 56 | $OCH_3$ | $CH_3$ | $CO_2C_2H_4NHCOCH_3$ | $CH_3$ | $CH_3$ | H |
| 57 | $NH_2$ | $CH_3$ | $COCH_3$ | $CH_3$ | $CH_3$ | $CH_2CH_2OH$ |
| 58 | $NH_2$ | $CH_3$ | $COC_2H_5$ | $CH_3$ | $CH_3$ | $C_6H_5$ |
| 59 | $NHC_2H_4OH$ | H | $(CH_3)_2CHCO$ | $CH_3$ | $CH_3$ | H |
| 60 | $NHC_2H_4OH$ | Ph | $COPh$ | $CH_3$ | $CH_3$ | H |
| 61 | $NHC_2H_4OH$ | Ph | $CN$ | $CH_3$ | $CH_3$ | H |
| 62 | $NHC_2H_4OH$ | H | $CO_2C_2H_5$ | $CH_3$ | $CH_3$ | H |
| 63 | $NHC_2H_4OH$ | H | $CO_2CH(CH_3)_2$ | $CH_3$ | $CH_3$ | H |
| 64 | $NHC_2H_4OH$ | H | $Ph$ | $CH_3$ | $CH_3$ | H |
| 65 | $NHC_2H_5$ | $CH_3$ | $CO_2C_2H_5$ | $CH_3$ | $CH_3$ | H |
| 66 | $NHCH_2CH_2C_2OCH_3$ | $CH_3$ | $CO_2C_2H_5$ | $CH_3$ | $CH_3$ | H |
| 67 | $NHC_4H_9$—n | $CH_3$ | $CO_2C_2H_5$ | $CH_3$ | $CH_3$ | H |
| 68 | $NHC_2H_4OC_2H_4OH$ | $CH_3$ | $CO_2C_2H_5$ | $CH_3$ | $CH_3$ | H |
| 69 | $NHC_2H_4OCCH_3$ (O) | $CH_3$ | $CO_2C_2H_5$ | $CH_3$ | $CH_3$ | $COC_2H_5$ |
| 70 | $N(C_2H_5)_2$ | $CH_3$ | $CO_2C_2H_5$ | $CH_3$ | $CH_3$ | $CH_2CH_2OC(O)C_6H_5$ |
| 71 | $N(CH_3)Ph$ | $CH_3$ | $COCH_3$ | $CH_3$ | $CH_3$ | $CH_2CH_2OH$ |
| 72 | $OCH_3$ | $CH_3$ | $CO_2CH_3$ | $CH_3$ | $CH_3$ | $CONH-C_6H_5$ |
| 73 | $OCH_3$ | $CH_3$ | $CO_2CH_3$ | $CH_3$ | $CH_3$ | $C(S)-NH_2$ |
| 74 | $OCH_2CH(C_2H_5)C_4H_9$—n | $CH_3$ | $CO_2CH_3$ | $CH_3$ | $CH_3$ | $CH_2CH_2CH_2OH$ |
| 75 | Ph | $CH_3$ | $CO_2Ph$ | $CH_3$ | $CH_3$ | $CH_2CH_2CH_2OH$ |
| 76 | $OCH_3$ | $CH_3$ | $CO_2C_6H_5$ | $CH_3$ | $CH_3$ | $CH_2CH_2CH_2OH$ |
| 77 | $OCH_3$ | $CH_3$ | $CO_2C_6H_{11}$ | $CH_3$ | $CH_3$ | $CH_2CH_2CH_2OH$ |
| 78 | $OCH_3$ | $CH_3$ | $CONH_2$ | $CH_3$ | $CH_3$ | $CH_2CH_2CH_2OCOC_2H_5$ |
| 79 | $OCH_2CH_2OC_4H_9$—n | $CH_3$ | $CO_2CH_3$ | $CH_3$ | $CH_3$ | $COCH(CH_3)_2$ |
| 80 | $NHC_2H_4OH$ | $CH_3$ | $NHC_2H_4OH$ | $CH_3$ | $CH_3$ | H |
| 81 | $NHC_2H_4OCCH_2CH_3$ (O) | $CH_3$ | $NHC_2H_4OCCH_2CH_3$ (O) | $CH_3$ | $CH_3$ | H |
| 82 | $NHC_8H_{17}$—n | $CH_3$ | $CO_2CH(CH_3)_2$ | $CH_3$ | $CH_3$ | H |

TABLE I-continued

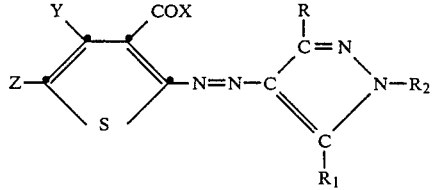

| Ex. | X | Y | Z | R | R₁ | R₂ |
|---|---|---|---|---|---|---|
| 83 | OCH₃ | CH₃ | CO-C₆H₅ (phenyl) | CH₃ | CH₃ | H |
| 84 | OCH₃ | H | COCH(CH₃)₂ | CH₃ | CH₃ | 2-methylbenzothiazol-3-yl |
| 85 | OCH₃ | Ph | COCH₃ | CH₃ | CH₃ | CH₂CH₂OH |
| 86 | Ph | H | COCH₃ | CH₃ | CH₃ | H |
| 87 | NH—S (benzothiazine) | CH₃ | CO₂C₂H₅ | CH₃ | CH₃ | H |
| 88 | O (pyran) | CH₃ | CO₂C₂H₅ | CH₃ | CH₃ | H |
| 89 | OCH₂C₆H₅ | CH₃ | CO₂C₂H₅ | CH₃ | CH₃ | H |
| 90 | OCH₃ | CH₃ | CONH-(2-OCH₃-C₆H₄) | CH₃ | CH₃ | H |
| 91 | OCH₃ | CH₃ | CONH-(2-OCH₃-C₆H₄) | CH₃ | CH₃ | —CH(CH₂)₂SO₂(CH₂)₂— (sulfolanyl) |
| 92 | OCH₃ | H | COCH(CH₃)₂ | CH₃ | CH₃ | H |
| 93 | OCH₃ | H | COCH(CH₃)₂ | CH₃ | CH₃ | CH₂CH₂OH |
| 94 | OCH₃ | CH₃ | CO₂CH₂CH₂N(phthalimido) | CH₃ | CH₃ | H |
| 95 | OCH₃ | H | 2-methylbenzothiazol-3-yl-methine | CH₃ | CH₃ | H |

TABLE I-continued

| Ex. | X | Y | Z | R | $R_1$ | $R_2$ |
|---|---|---|---|---|---|---|
| 96 | $OC_2H_5$ | H | 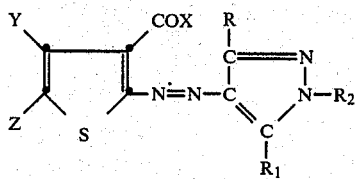 | $CH_3$ | $CH_3$ | $CH_2CH_2OH$ |

The invention has been described in detail with particular reference to preferred embodiments thereof, but it will be understood that variations and modifications can be effected within the spirit and scope of the invention.

We claim:

1. A dye of the formula:

wherein: X is alkyl; Y is hydrogen or alkyl; Z is COQ where Q is alkoxy, alkylamino, arylamino, or 2-thienyl; R and $R_1$ are each alkyl; $R_2$ is hydrogen, alkyl, benzothiazolyl, or sulfolanyl; and wherein the hydrocarbon moieties of the above are unsubstituted or substituted with hydroxy or alkoxy.

2. The dye according to claim 1 having the formula

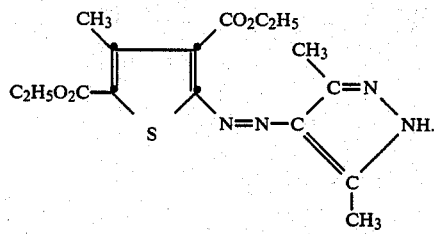

3. The dye according to claim 1 having the formula

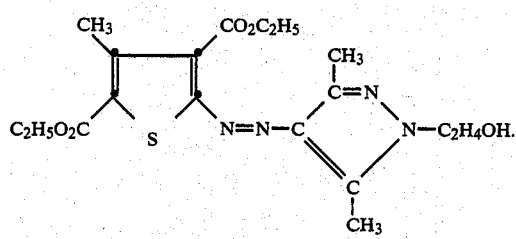

4. The dye according to claim 1 having the formula

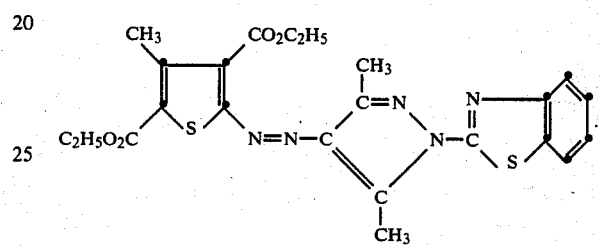

5. The dye according to claim 1 having the formula

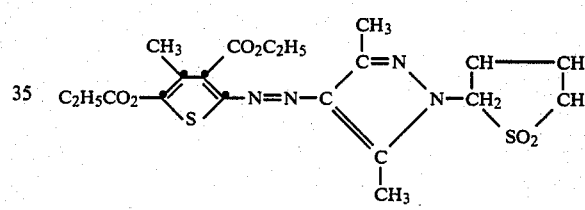

6. The dye according to claim 1 having the formula

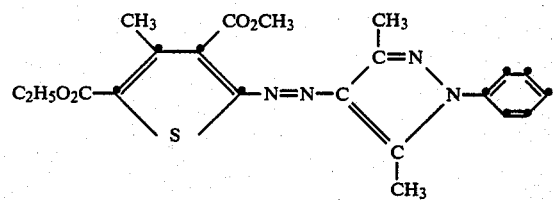

7. The dye according to claim 1 having the formula

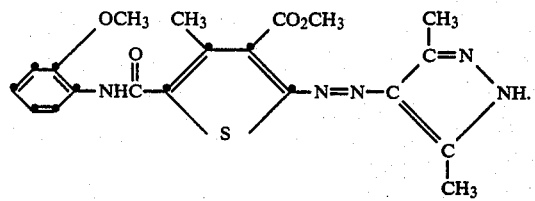

8. The dye according to claim 1 having the formula

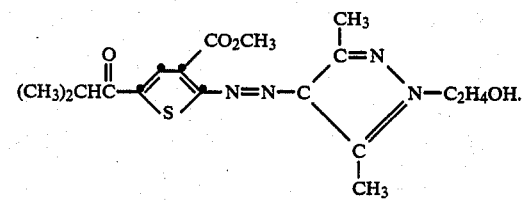

* * * * *